(12) United States Patent
Cubon et al.

(10) Patent No.: US 10,674,830 B1
(45) Date of Patent: Jun. 9, 2020

(54) SELF-REGULATING HEATED SEAT CUSHION

(71) Applicant: Horizons, Inc., Cleveland, OH (US)

(72) Inventors: Michael M. Cubon, Park Ridge, IL (US); Gilbert C. Hooper, III, Baltimore, MD (US)

(73) Assignee: TRAMEC TERMICO TECHNOLOGIES, L.L.C., Iola, KS (US)

( * ) Notice: Subject to any disclaimer, the term of this patent is extended or adjusted under 35 U.S.C. 154(b) by 0 days.

(21) Appl. No.: 16/139,388

(22) Filed: Sep. 24, 2018

Related U.S. Application Data

(60) Provisional application No. 62/561,887, filed on Sep. 22, 2017.

(51) Int. Cl.
| | | |
|---|---|---|
| A47C 7/74 | (2006.01) | |
| A47C 7/02 | (2006.01) | |
| H02S 40/40 | (2014.01) | |
| H05B 3/34 | (2006.01) | |

(52) U.S. Cl.
CPC .............. *A47C 7/748* (2013.01); *A47C 7/021* (2013.01); *H02S 40/40* (2014.12); *H05B 3/34* (2013.01); *H05B 2203/029* (2013.01)

(58) Field of Classification Search
CPC ......... A47C 7/748; A47C 7/021; H02S 40/40; H05B 3/34; H05B 2203/029
USPC ...................................... 297/180.12
See application file for complete search history.

(56) References Cited

U.S. PATENT DOCUMENTS

| | | | |
|---|---|---|---|
| 7,810,434 B2 * | 10/2010 | Flom ...................... | B61B 12/002 104/89 |
| 8,388,056 B2 * | 3/2013 | Smith ..................... | A47C 4/286 297/16.2 |
| 9,168,852 B2 * | 10/2015 | Line ......................... | B60N 2/56 |
| 2004/0036325 A1 * | 2/2004 | Diemer .................. | H05B 3/146 297/180.12 |
| 2006/0267260 A1 * | 11/2006 | Stowe ................... | B60N 2/5621 267/143 |
| 2007/0001506 A1 * | 1/2007 | Stowe ................... | B60N 2/5635 297/452.42 |
| 2007/0152479 A1 | 7/2007 | Howman et al. | |
| 2016/0107552 A1 * | 4/2016 | Wakeman .............. | A47C 31/10 297/229 |
| 2016/0262543 A1 * | 9/2016 | Currie .................... | A47C 7/748 |

* cited by examiner

*Primary Examiner* — Mark R Wendell
(74) *Attorney, Agent, or Firm* — Tarolli, Sundheim, Covell & Tummino LLP

(57) ABSTRACT

A seat cushion includes a support member. A cover encloses the support member. A self-regulating heating device extends between the support member and an upper portion of the cover.

16 Claims, 3 Drawing Sheets

US 10,674,830 B1

SELF-REGULATING HEATED SEAT CUSHION

RELATED APPLICATIONS

This application claims priority from U.S. Provisional Application Ser. No. 62/561,887, filed Sep. 22, 2017, the subject matter of which is incorporated herein by reference in its entirety.

FIELD OF THE INVENTION

The present invention relates to a self-regulating, heated seat cushion and, more specifically, to a seat cushion heated by a polymeric positive temperature coefficient (PTC) heater.

BACKGROUND OF THE INVENTION

There is a growing need for heated seat cushions and backrests for outdoor and/or cold-weather venue seating environments such as stadiums, amphitheaters, and municipality seating venues such as parks and public transit areas. Also, there is increased demand for safe, inexpensively-powered heated cushions for outdoor recreation activities such as hunting, fishing, and operating ATV's, UTV's, etc. A known seat cushion/backrest heating system uses a fixed wattage method of providing conductive heat to the user. Generally, a fixed resistance heater is inserted into the seat and/or backrest cushion upon which the occupant will sit. This heater can be a stitched wire, carbon fiber, or an etched heater pad. These heating systems usually have a single point temperature feedback loop or a thermostat shutoff. The fixed resistance heaters have a constant current draw during operation of the heater.

There are several disadvantages for these types of fixed resistance seat heating systems. All of these fixed resistance systems have a failure mode which could be hazardous to the user. Use of a fixed resistance heater requires a sensing device, such as a thermostat, to control the temperature. This method of temperature sensing measures the temperature of a single point on the heater and assumes that the rest of the heater is operating at the same temperature. In the event this sensing device malfunctions, or if the temperature increases in other areas of the heater outside of the sensor, the heating device could produce a hazardous condition to the user.

Another challenge is providing an inexpensive method to provide renewable power to these heaters in cold environments over extended periods of time. Battery life, size, portability and durability are all major considerations to cost-effectively provide continuous power to these heated devices.

SUMMARY OF THE INVENTION

The present invention is directed to a seat cushion having a support member. A cover encloses the support member. A self-regulating heating device extends between the support member and an upper portion of the cover. The self-regulating heating device may include a resistive layer that experiences a positive temperature coefficient (PTC) effect when heated.

The seat cushion may have a rechargeable battery and/or a photovoltaic cell. The photovoltaic cell converts energy from light into electrical energy to recharge the battery. The photovoltaic cell may be connected to an outer surface of a lower portion of the cover opposite the heating device. The photovoltaic cell may also be on the same surface/substrate as the heating device. If the heating device and the photovoltaic cell are on the same surface/substrate the heating device operation will keep the photovoltaic cell free from ice/snow build-up. The photovoltaic cell may be external to the seat cushion.

BRIEF DESCRIPTION OF THE DRAWINGS

The foregoing and other features and advantages of the present invention will become apparent to one skilled in the art upon consideration of the following description of the invention and the accompanying drawings, in which.

DETAILED DESCRIPTION

Figure 1:
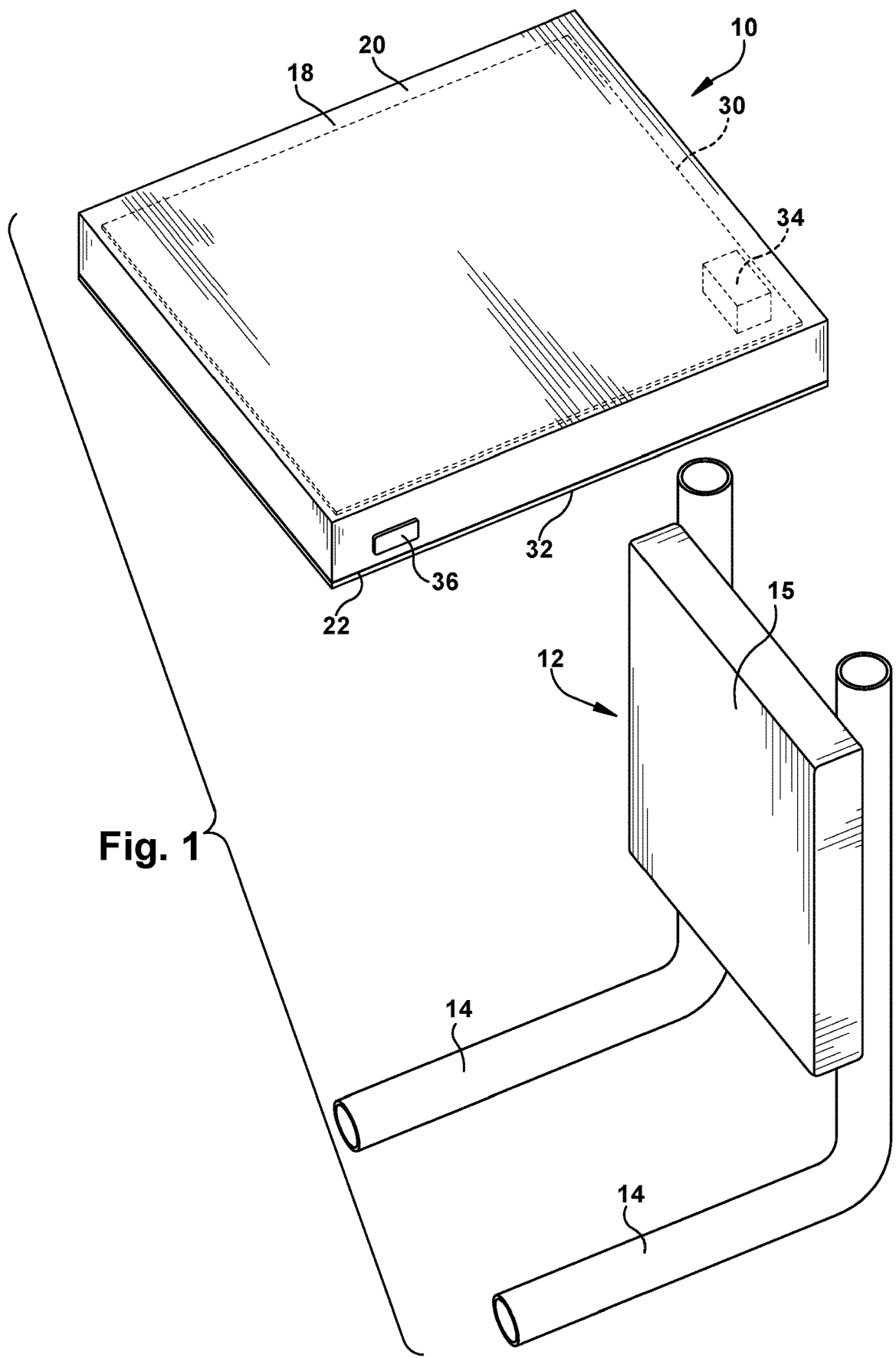
FIG. 1 is a schematic exploded view of a seat cushion constructed in accordance with the present invention.

FIG. 1 illustrates a heated seat cushion 10. A backrest 12 may extend from the seat cushion 10. The backrest 12 may include backrest frame members 14 and a padded member 15 connected to the frame members 14. The seat cushion 10 may include hook and loop fasteners that connect the frame members 14 to the seat cushion. The backrest 12 may be connected to the seat cushion 10 in any desired manner. It is contemplated that the backrest 12 may be pivotally connected to the seat cushion 10 to allow the backrest to be folded onto the seat cushion for ease of portability. The seat cushion 10 may be placed on a support member, such as a bleacher or stadium seat. The seat cushion 10 may be used without the backrest 12.

Figure 2:
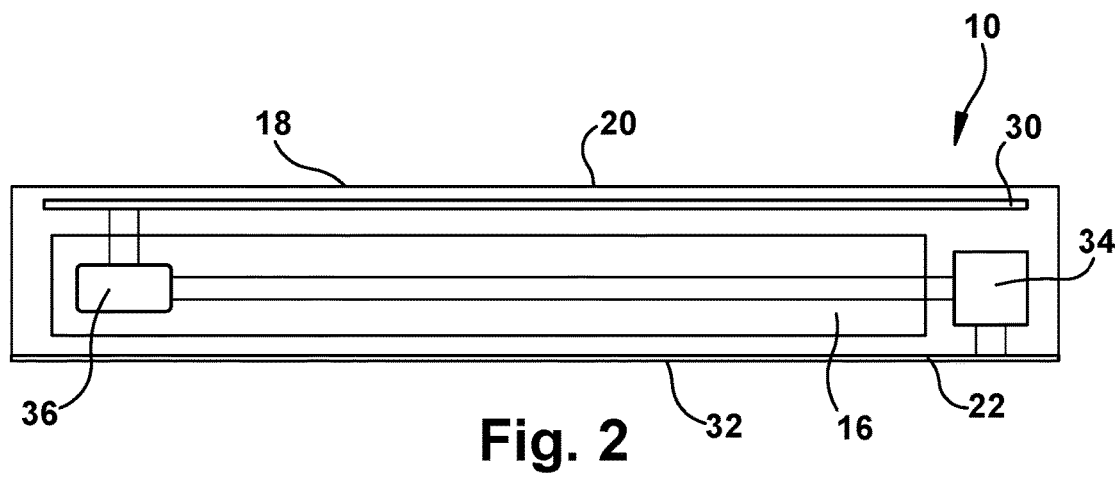
FIG. 2 is a sectional view of the seat cushion of FIG. 1.

The seat cushion 10 (FIGS. 1 and 2) may include a support member 16 encased by a cover 18. The support member 16 may be a foam or padded member. The cover 18 may be constructed of any desired material such as a fabric. The cover 18 has an upper portion 20 and a lower portion 22 opposite to the upper portion. A user generally sits on the upper portion 20 of the cover 18 and the lower portion 22 rests on the support member. The seat cushion 10 also includes a self-regulating heating device 30 connected to at least one of the foam member 16 and the upper portion 20 of the cover 18. The heating device 30 may be located between the foam member 16 and the upper portion 20 of the cover 18. The heating device 30 may be secured to the support member 16 or the upper portion 20 of the cover 18 with adhesive or stitching.

A photovoltaic cell 32 is connected to an outer surface of the lower portion 22 of the cover 18. The photovoltaic cell 32 is connected to the cover 18 on a lower side of the cushion 10 opposite the heating device 20. The photovoltaic cell 32 may extend generally parallel to the heating device 30 with the support member 16 extending between the heating device and the photovoltaic cell. It is contemplated that the photovoltaic cell 32 may be integrated into the cover 18. The photovoltaic cell 32 may be deposited directly on the lower surface of the cover 18 by screen printing. Other methods of depositing the photovoltaic cell 32 can include laser printing, coating, pad printing and ink jet printing. The photovoltaic cell 32 may be covered with a clear durable coating that would withstand the rigors of an outdoor stadium seat.

Figure 3:
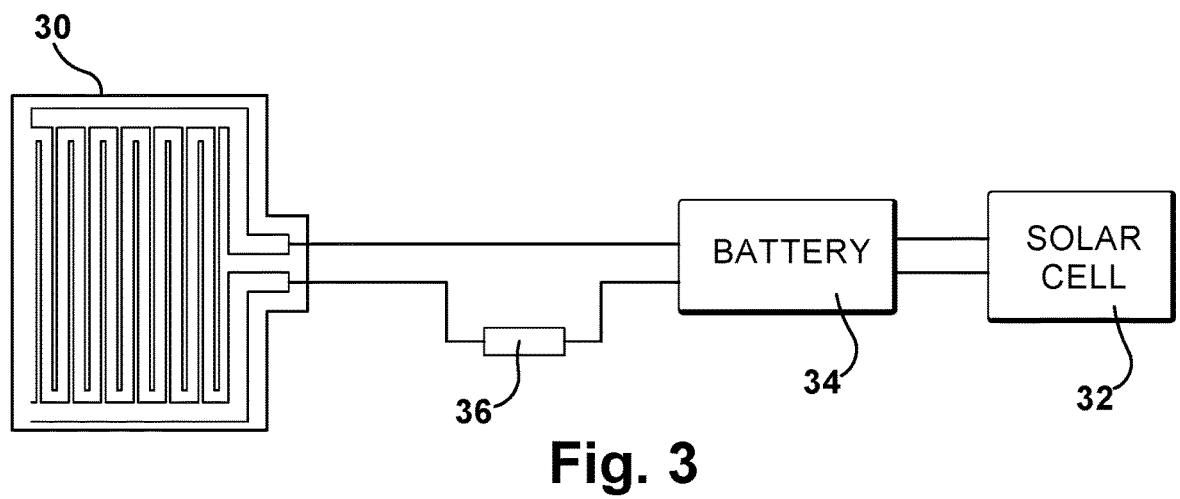
FIG. 3 is a schematic view of a self-regulating heating device of the seat cushion of FIG. 1.

The photovoltaic cell 32 has a solar active portion made of solar sensitive materials or photovoltaic materials such as titanium oxide and/or silicon. The photovoltaic cell 32 converts energy from light into electrical energy to recharge the battery 34. The photovoltaic cell 32 (FIG. 3) is electrically connected to a rechargeable battery 34. The battery 34 is electrically connected to the heating device 30. A switch 36 may be connected between the heating device 30 and the battery 34. The switch 36 has an on position in which power is transmitted to the heating device 30 from the battery 34 and an off position in which the switch prevents power from being transmitted to the heating device. The battery 34 and the switch 36 are optional and not required.

Figure 4:
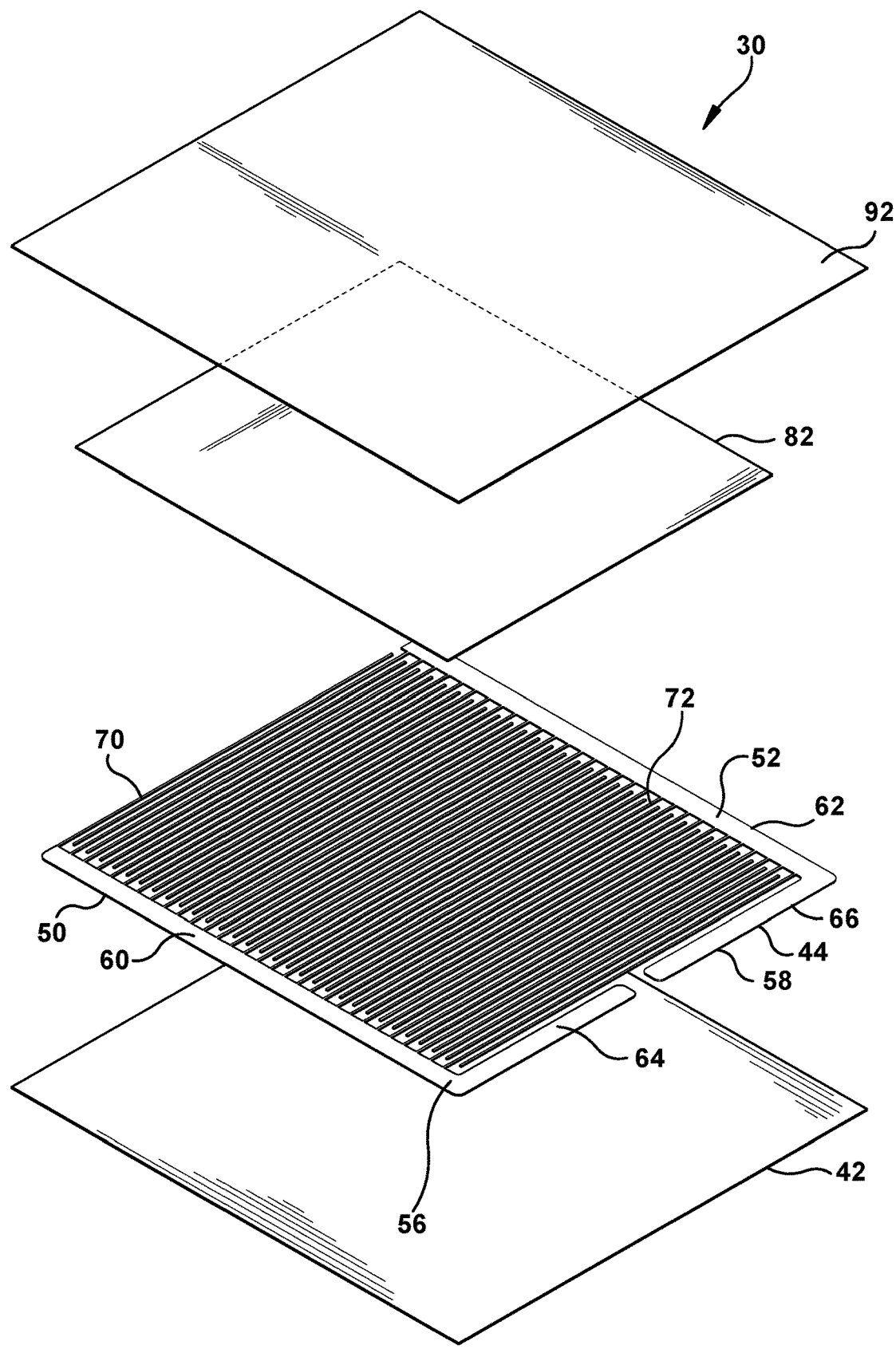
FIG. 4 is an exploded view of the heating device of FIG. 3.

The heating device 30 may be a positive temperature coefficient (PTC) heater that includes a first layer or substrate 42 (FIG. 4) made of an electrically insulating material. The first layer 42 may be relatively thin and flexible. Preferably, the first layer 42 is a film substrate made of any desired electrically insulating material such as Mylar. The first layer 42 may be made of a material that is semi-rigid, rigid, clad or unclad.

A second or electrically conductive layer 44 made of an electrically conductive material is connected to the first layer 42 and engages the first layer. The second layer 44 may be made of a flexible polymeric media. The second layer 44 may be connected to the first layer 42 in any desired manner and is preferably screen printed on the first layer. The second layer 44 may be connected to the first layer 42 by close tolerance screen printing, digital printing, inkjet printing, flexographic printing, or gravure printing.

The second layer 44 includes at least two buses 50 and 52 spaced from each other. The patterns of the buses 50, 52 determine the watt density of the heating device 30. The buses 50 and 52 may include bases 56 and 58 having a relatively large width. The bases 56 and 58 may include first portions 60 and 62 extending generally parallel to each other. Although the first portions 60 and 62 are shown extending in a straight line, it is contemplated that the first portions may extend in any desired direction.

The bases 56 and 58 may include second portions 64 and 66 extending toward each other from the first portions 60 and 62. The second portions 64 and 66 may extend perpendicular to the first portions 60 and 62. Although the second portions 64 and 66 are described as extending perpendicular to the first portions 60, 62, it is contemplated that the second portions 64 and 66 may extend in any desired direction.

The buses 50 and 52 may include finger portions 70 and 72 extending from the first portions 60 and 62. The finger portions 70 and 72 may extend generally between each other and parallel to each other and the second portions 64 and 66 of the bases 56 and 58. The finger portions 70 and 72 may have a width substantially smaller than the width of the bases 56 and 58. Although the finger portions 70, 72 are described as extending generally parallel to the second portions 64, 66, it is contemplated that the finger portions may extend in any desired direction. Although the buses 50, 52 are described as having a specific shape, it is contemplated that the buses 50, 52 may have any desired shape.

A third or resistive layer 82 that experiences a positive temperature coefficient (PTC) effect when heated is connected to the second or conductive layer 44. The third layer 82 engages the second layer 44. The third layer 82 may be connected to the second layer 44 in any desired manner and is preferably screen printed on the second layer. The third layer 82 is connected to the second layer 44 so that the second layer is between the third layer and the first layer 42. The third layer 82 electrically connects the buses 50 and 52 of the second layer 44. The third layer 82 has a higher electrical resistance than the second layer 44. The third layer 82 generates heat when a voltage is applied across the buses 50, 52.

The third or resistive layer 82 includes a conductive carbon black filler material dispersed in a polymer that has a crystalline structure. The crystalline structure densely packs the carbon particles into a crystalline boundary so the carbon particles are close enough together to allow electrical current to flow through the polymer insulator via these carbon "chains" between the first and second buses 50 and 52. When the polymer is at normal room temperature, there are numerous carbon chains forming conductive paths through the material. Heat is produced when current flows through the polymeric device. Heating causes the temperature of the polymer to rise. As the heating continues, the temperature of the material continues to rise until it exceeds a phase transformation temperature. As the material passes through the phase transformation temperature, the densely packed crystalline polymer matrix changes to an amorphous structure. The phase change is accompanied by an expansion of the polymer. As the conductive particles move apart from each other, most of them no longer conduct current and the resistance of the heating device 30 increases sharply. The heating device 30 will reach a designed steady state temperature and will draw reduced amperage to maintain the steady state temperature. The heating device 30 will stay "warm", remaining in this high resistance state as long as the power is applied. Removing the power source will reverse the phase transformation and allow the carbon chains to re-form as the polymer re-crystallizes. The heater resistance returns to its original value.

A fourth or interface layer 92 is directly connected to the third layer 82 so that the fourth layer engages the third layer. The fourth layer 92 may be an adhesive or film that completely seals the heating device 30. The fourth layer 92 can be a double sided adhesive and allow for the heating device 30 to be assembled directly to the foam member 16 or the cover 18.

The design flexibility of the heating device 30 allows for a myriad of shapes and sizes. It is also contemplated that the fingers 70, 72 and bases 56, 58 may be located closer to each other in predetermined areas of the heating device 30 to increase the watt density of the heater in the predetermined areas.

Although the heating device 30 and the photovoltaic cell 32 are shown as being separate members, it is contemplated that the heating device 30 and the photovoltaic cell 32 may both be connected to a common flexible substrate that is bent to permit the heating device and the photovoltaic cell to extend on opposite sides of the foam member 16. It is contemplated that the photovoltaic cell 32 may be printed on the first layer or substrate 42 of the heating device 30 and sealed by the fourth layer 92.

A user of the seat cushion 10 sits on the upper portion 20 of the cover 18 adjacent the heating device 30. When the switch 36 is in the on position, the heating device 30 increases in temperature to provide heat to the user. When the seat cushion 10 is not in use, the switch 36 is in the off position. The seat cushion 10 may be stored in a location with the lower portion 22 of the cover 18 facing upward so that the rechargeable battery 34 may be recharged by the photovoltaic cell 32. The seat cushion 10 does not require a temperature sensor or thermostat that senses the temperature of the heating device 30 or the seat cushion. Therefore, the heating device 30 is self-regulating. A sensor may be used for multiple temperature settings.

It is contemplated that the cushion 10 may include a plurality of heaters in desired locations on the seat. Also, the photovoltaic cell 32 may be placed on any desired portion of the cushion and the cushion may include a plurality of photovoltaic cells placed in desired locations on the cushion. Small heat zones may be provided on the solar powered side of the cushion 10 to keep snow/ice from building up on the photovoltaic cell 32. It is also contemplated to allow for the removal of the rechargeable battery for charging in a traditional charging system. The battery 34 may be screen printed onto the heater substrate 42 or may be a standalone screen-printed power storage device. Additional electronic components like resistors, capacitors or programmable components may also be used.

Although the backrest 12 is not described as having a heating device, it is contemplated that the backrest 12 may also have a heating device similar to the heating device 30. The heating device in the backrest may be electrically connected to the switch 36, rechargeable battery 34 and photovoltaic cell 32 in the seat cushion 10. Alternatively, the backrest may include a switch, a rechargeable battery and photovoltaic cell for providing power to the heating device in the backrest.

Having described the invention, the following is claimed:

1. A seat cushion comprising:
   a support member;
   a cover enclosing the support member;
   a self-regulating heating device extending between the support member and an upper portion of the cover; and
   a photovoltaic cell that is integrated into the cover, the photovoltaic cell converting energy from light into electrical energy to power the heating device.

2. The seat cushion according to claim 1 wherein the self-regulating heating device includes a resistive layer that experiences a positive temperature coefficient (PTC) effect when heated.

3. The seat cushion according to claim 2 wherein the heating device includes a first layer made of an electrically insulating material, a second layer having first and second buses spaced from each other and connected to the first layer, the resistive layer being electrically connected to the first and second buses, the resistive layer having a higher electrical resistance than the first and second buses.

4. The seat cushion according to claim 3 wherein the first layer is flexible.

5. The seat cushion according to claim 3 wherein the first layer is rigid.

6. The seat cushion according to claim 1 wherein the photovoltaic cell is connected to an outer surface of the cover.

7. The seat cushion according to claim 6 wherein the photovoltaic cell is connected to a lower portion of the cover opposite the heating device.

8. The seat cushion according to claim 1 further including a switch having an on position in which power is transmitted to the heating device and an off position in which the switch prevents power from being transmitted to the heating device.

9. The seat cushion according to claim 1 wherein the photovoltaic cell and the heating device extend generally parallel to each other.

10. The seat cushion according to claim 9 wherein the support member extends between the heating device and the photovoltaic cell.

11. The seat cushion according to claim 1 wherein the heating device and the photovoltaic cell are deposited directly on the cover.

12. The seat cushion according to claim 1 wherein the heating device is connected to the support member.

13. The seat cushion according to claim 1 wherein the heating device is connected to the upper portion of the cover.

14. The seat cushion according to claim 1 further including a backrest extending from the cushion.

15. The seat cushion according to claim 1 further including a rechargeable battery, the photovoltaic cell converting energy from light into electrical energy to recharge the battery and provide power to the heating device.

16. The seat cushion according to claim 1 being free of a temperature sensor.

* * * * *